United States Patent
Kyeng-Jung (12)

(10) Patent No.: US 6,692,667 B2
(45) Date of Patent: Feb. 17, 2004

(54) PROCESS OF MAKING A PHOSPHORESCENT FIBER

(75) Inventor: Kang Kyeng-Jung, Seoul (KR)

(73) Assignees: Glowyarn Co., Ltd., Kyungsangbuk-do (KR); Minse Lee, Seoul (KR)

( * ) Notice: Subject to any disclaimer, the term of this patent is extended or adjusted under 35 U.S.C. 154(b) by 273 days.

(21) Appl. No.: 09/802,317

(22) Filed: Mar. 7, 2001

(65) Prior Publication Data

US 2001/0045677 A1 Nov. 29, 2001

Related U.S. Application Data

(63) Continuation of application No. 09/405,343, filed on Sep. 24, 1999, now abandoned.

(30) Foreign Application Priority Data

Dec. 19, 2000 (KR) .......................................... 2000-78500

(51) Int. Cl.$^7$ .......................... B01J 13/10; C09K 11/00; D01F 1/10
(52) U.S. Cl. ........................... 264/21; 264/28; 264/211; 427/213.36
(58) Field of Search .............................. 264/4, 4.33, 21, 264/28, 211; 427/213.36

(56) References Cited

U.S. PATENT DOCUMENTS 5,674,437 A * 10/1997 Geisel ........................ 264/21
5,686,022 A * 11/1997 Murayama et al. ...... 252/351.4
5,914,076 A * 6/1999 Schloss ........................ 264/21

FOREIGN PATENT DOCUMENTS

JP 08127937 A * 5/1996

* cited by examiner

Primary Examiner—Leo B. Tentoni
(74) Attorney, Agent, or Firm—F. Chau & Associates, LLP

(57) ABSTRACT

A method of making phosphorescent fiber having phosphorescent particles composed, by weight, of 55–62.5% of strontium oxide, 35–42.5% of aluminum oxide, 1–9% of dysprosium oxide and 0.5–1.5% of europium oxide encapsulated with a wall material. The encapsulated particles are mixed and pelletized at a weight ratio of 15–25:85–75 with polymer capable of fiber formation to give a master batch, which is then compounded at a weight ratio of 30–70:70–30 with a polymer mixture, in combination with a softener and a dispersing agent. Polymer mixture consists of two polymers. One is the same polymer used to produce a master batch, the other is a polymer in the same chemical structure but different in physical properties such as melt index and tenacity. The compounded chip is melt-spun at 190–290° C. through a melt extruder. The fibers with the encapsulated phosphorescent particles exhibit such excellent physical properties as to be applicable to various textile products and show a high degree of luminescence.

9 Claims, 2 Drawing Sheets

PROCESS OF MAKING A PHOSPHORESCENT FIBER

This is a Continuation of application Ser. No. 09/405,343, filed Sep. 24, 1999, now abandoned.

BACKROUND OF THE INVENTION

1. Field of the Invention

The present invention relates to phosphorescent fibers with a high degree of luminescence and a method for manufacturing the same. More particularly, the present invention relates to the encapsulation of phosphorescent particles, thereby enabling large-size phosphorescent particles of irregular shapes to be used without problems.

2. Description of the Prior Art

Recently, phosphorescent materials have found applications in various fields, including clocks, electronic appliances, decorative finish, marks, fire safety equipments, illuminators, fashion products, toys, and cloths and textile products.

The cloths and textile products having luminescent properties are usually coated with phosphorescent pigments. Alternatively, synthetic fibers are spray-coated with phosphorescent pigments to provide luminescent properties to cloths and textile products. After being worn or washed, the cloths or textile products prepared in these coating methods, however, strongly tend to be deprived of the phosphorescent pigments coated. Further, such products are low in afterglow brightness level and short in an afterglow extinction time.

Another method for providing luminescence to cloths or textile products is to prepare fibers from phosphorescent pigment-added synthetic resins. This method also fails to overcome the problems of a short afterglow extinction time and low afterglow brightness. Another disadvantage of this method is that a relatively large amount of phosphorescent pigment is required, causing economic burden and making the mechanical properties of the fibers poor.

ZnSiCu-based phosphorescent pigments, which commonly are used, are problematic in practical uses because the afterglow brightness is low and the length of time for which the fiber is luminescent is short. According to these results, a relatively large amount of pigment is needed to provide satisfactory luminescent properties to fiber. Also, ZnSiCu-based phosphorescent pigments are not applied to cloths and textile products because of their being poor in chemical stability, light fastness and weathering resistance.

U.S. Pat. No. 5,914,076, yielded to Marc Schloss et al., discloses a phosphorescent fiber with a high degree of luminescence. To obtain this fiber, first, flow agent particles, aluminum oxide C, are blended with metal oxide phosphor particles in an amount less than or equal to 2% by weight of the phosphor particles. The blended particles are finely sifted through a 10 microns screen, in a sonic-sifting apparatus. The sifted particles are introduced into a carrier resin, consisting of thermoplastic polymers such as polyamide, polyester, and polypropylene, during the melt-stage of an extrusion and pelletizing process, to form pellets in an amount of less than or equal to 30% by weight of the polymer. From the pellets, phosphorescent textile yarn is formed in an amount of less than or equal to 10% by volume of the polymer.

This fiber is advantageous in that the spinning process can be uniformly carried out with a reduction in problems including yarn cutting because the phosphorescent particles are uniformly globular with a small particle size. This fiber is, however, significantly poor in luminescent properties, the most important characteristic. To avoid this problem, the amount of the phosphorescent pigment may be increased but, in this case, the yarn cutting as well as the production cost increases.

The relationship between particle size and after glow strength of phosphorescent particles is shown in Tables 1 and 2, below. This data was obtained by exposing two types of phosphorescent particles with average particle sizes of 42 $\mu$m and 9 $\mu$m, respectively, to a commercial light source 4001×D65 for 20 minutes and measuring their afterglow brightness (light density) by use of a color luminance meter, such as that manufactured by Topcon, identified as BM-5A (angle of measurement 2, measuring lens 3). As can be seen in Tables 1 and 2, the phosphorescent particles with average particle sizes of 42 $\mu$m and 9 $\mu$m were found to have an afterglow brightness of 1890 mcd/m$^2$ and 1097 mcd/m$^2$ at 1 min after exposure, respectively. The smaller particles are calculated as having only 58% the afterglow brightness of the larger ones. The reduction in afterglow brightness of phosphorescent particles occurs at the same rate for both particle sizes. Thus, smaller phosphorescent particles show weaker initial brightness levels and suffer from quicker disappearance of afterglow brightness, so that they are less desirable to apply to phosphorescent synthetic fibers.

TABLE 1

Phosphorescent Particle Grades and Average Particle Sizes of LUMINOVA (From the Nemoto Co., Ltd., Japan)

| Grade | G-300C | G-300M | G-300F | G-300FF |
|---|---|---|---|---|
| Avg. size ($\mu$m) | 42 | 19 | 9.0 | 1.4 |

TABLE 2

Afterglow Brightness According to Particle Size

| | Afterglow Brightness (mcd/m$^2$) | | | |
|---|---|---|---|---|
| Time After Exposure | G-300C | G-300M | G-300F | F-300FF |
| 1 min | 1890 | 1512 | 1097 | 495 |
| 5 min | 589 | 470 | 346 | 129 |
| 10 min | 384 | 276 | 203 | 69 |
| 20 min | 189 | 150 | 110 | 35 |
| 30 min | 128 | 102 | 74 | 23 |
| 1 hr | 63 | 50 | 37 | 10 |

Therefore, there is no choice but to increase the content of phosphorescent particles in order to improve the luminescent properties if the particle size is not changed. However, if they are used in a large amount, phosphorescent pigment, although being uniform in morphology and small in size, caused yarn cutting and damage of equipments. Additionally, a large amount of phosphorescent particles experience difficulty in being dispersed with synthetic resins, so that uniform luminescent properties cannot be affected throughout the phosphorescent fibers prepared therefrom. Further, a large amount of phosphorescent particles give rise to an increase in the production cost.

U.S. Pat. No. 5,674,437, yielded to Richard H. Geisel et al., discloses a process for providing luminescence for fibrous material by mixing metal aluminate oxide pigment with thermoplastic resins and melt extruding the mixture into a fibrous phase. Also, Richard H. Geisel et al., report that a fiber comprising 9.1% by weight of metal aluminate oxide pigment exhibits a light density of over 1000 mcd/m$^2$ after one minute and shows a light density of approximately 100 mcd/m$^2$ after approximately 80 minutes. According to the above tables 1 and 2, however, it is impossible to obtain the above results because a luminescent fiber produced by Richard H. Geisel et al. contains metal aluminate oxide pigment in which particle size of the metal aluminate oxide pigment is from 12 to 21 microns. The picture of the phosphorescent fibers comprising about 9% by weight of phosphorescent pigment with an average particle size of 42 $\mu$m and 19 $\mu$m, respectively, is shown in FIG. 1. Phosphorescent fibers containing phosphorescent pigment with an average particle size of 42 $\mu$m and 19 $\mu$m show a light density of 900 mcd/m$^2$ and 650 mcd/m$^2$ after one minute, respectively.

U.S. Pat. No. 5,686,022, yielded to Yoshihiko Murayama et al., refers to a phosphorescent phosphor represented by M1−xAl2O4−x wherein x is not zero and M is selected from the group consisting of calcium, strontium, barium, and mixtures thereof, comprising europium as an activator and a metal as a co-activator selected from cerium, praseodymium, neodymium, thulium, terbium, dysprosium, holmium, erbium and mixtures thereof. Nowhere is mentioned the application of the phosphorescent phosphor to fibers.

SUMMARY OF THE INVENTION

Accordingly, it is an object of the present invention to provide a phosphorescent fiber, which can show longer-lasting, high, uniform luminescence there throughout.

It is another object of the present invention to provide a phosphorescent fiber, which is superior in light fastness and weathering resistance.

It is still a further object of the present invention to provide a phosphorescent fiber, which has such excellent physical properties as to be applicable to various textile products.

It is still another object of the present invention to provide a method for manufacturing a phosphorescent fiber, by which phosphorescent particles, with an average particle size of 42 $\mu$m and a size distribution of 10–60 $\mu$m, can be used while apparatuses such as spinnerets can be operated at constant spinning conditions with minimal damage and no yarn cutting.

BRIEF DESCRIPTION OF THE DRAWINGS

FIG. 1a is photograph taken in the light place and FIG. 1b is photograph taken in the dark place after exposure.

DETAILED DESCRIPTION OF THE INVENTION

Figure 1A:
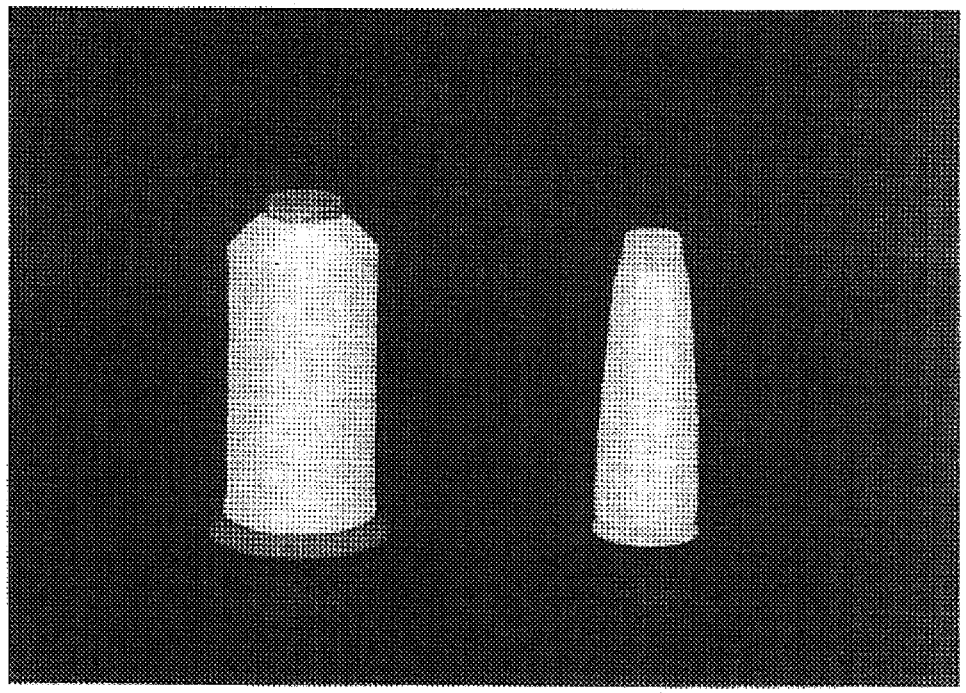
FIG. 1a and FIG. 1b are photographs shown the luminescent properties of the present invention's fiber (left) and the fiber disclosed in U.S. Pat. No. 5,674,437 (right)
Figure 1B:
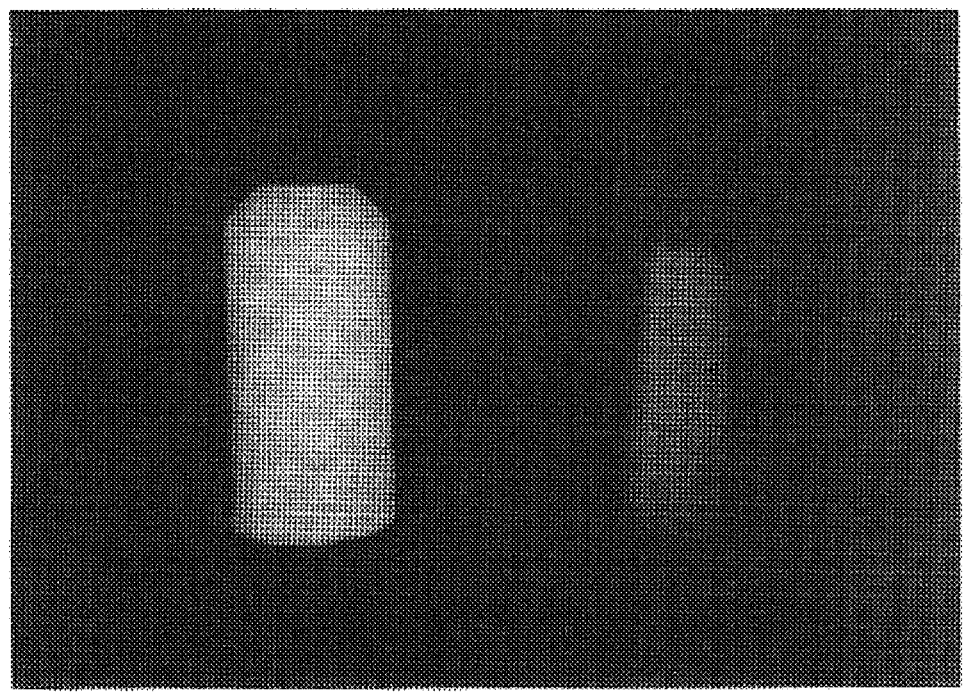
Figure 2:
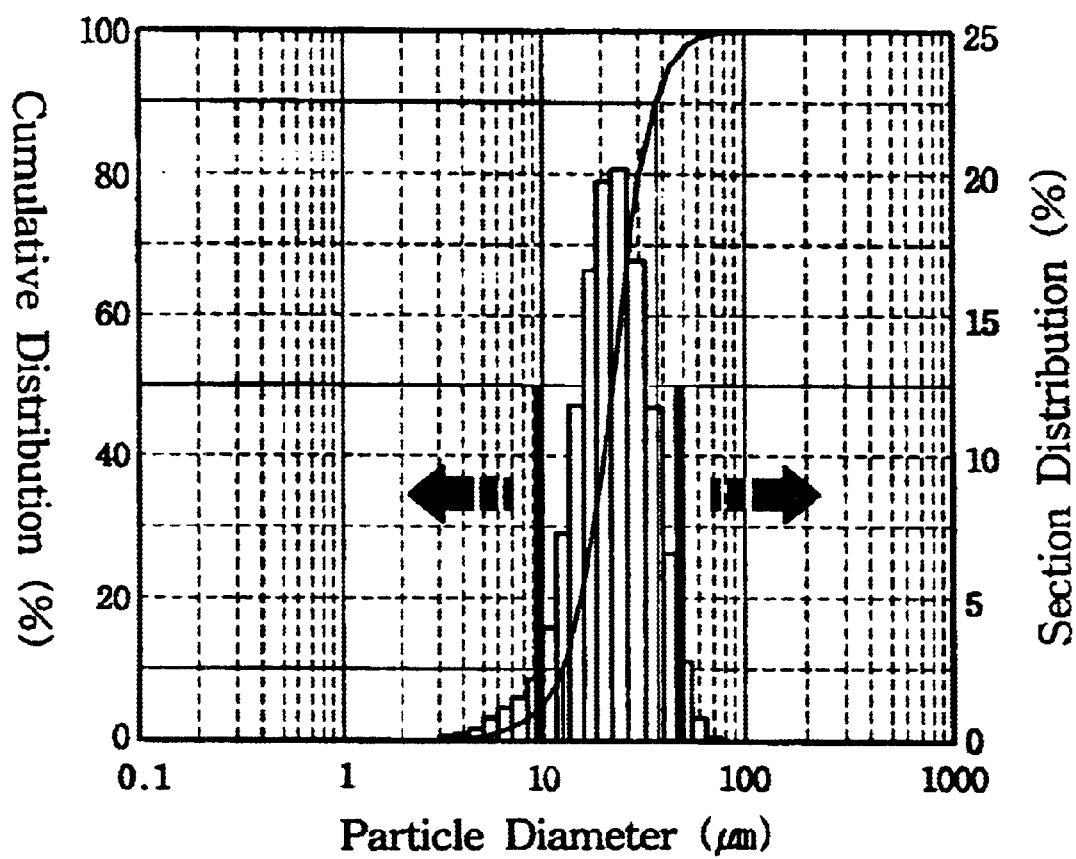
FIG. 2 is a diagram showing a particle size distribution of phosphorescent pigment used in the present invention.

In the present invention, phosphorescent pigment is composed of 55–62.5% by weight of strontium oxide, 35–42.5% by weight of aluminum oxide, 1–9% by weight of dysprosium oxide and 0.5–1.5% by weight of europium oxide. Ranging in particle size distribution from 10 to 60 $\mu$m, the phosphorescent pigment has an average particle size of about 42 $\mu$m as shown the FIG. 2, 80% of which are globular with the other 20% being of needle-like morphology.

Generally, when synthetic fibers are manufactured on melt-spinning process by synthetic resins combined with fillers such as phosphorescent particles, it is preferred that the fillers are uniform in shape and have a small size because their shape and size have a great influence on the spinning condition. However, if the phosphorescent particle is small in particle size, the luminescent properties are poor. On the other hand, a phosphorescent particle, which is too large in particle size, is apt to damage equipments such as spinning machines and take-up rollers, and maybe unfavorable for maintaining constant spinning conditions including causing the problems such as yarn-cutting, though the luminescent properties are excellent. According to these results, when account is taken of phosphorescence, the phosphorescent particles useful in the present invention preferably have an average size of about 42 $\mu$m. However, the phosphorescent particles used in the present invention may be unfavorable for maintaining constants spinning conditions because of their particle size being larger than that of commonly used fillers. In addition, there is no interaction between phosphorescent pigment and synthetic resins capable of fiber formation. In other words, phosphorescent pigment is not compatible with the synthetic resins. And then, phosphorescent particles are so hard that they damage the spinning machine upon spinning or the take-up roller upon winding. These problems may be aggravated by the phosphorescent particles of the present invention because about 20% of them are of needle-like shapes. To circumvent these problems, the phosphorescent particles are encapsulated.

For phosphorescent polypropylene, polyester or nylon fibers, the encapsulation of phosphorescent particles may be achieved by a phase-separation method through the complex coacervation using maleic anhydride-grafted polypropylene (MAH-PP) as a wall material. However, the amount of the wall material encapsulating the particles is minimized by adjusting the ratio of the phosphor particles to MAH-PP to prevent the degradation of the luminescent properties caused by the encapsulation of phosphorescent particles.

The encapsulated phosphorescent particles were pelletized with a polymer to produce a master batch. A master batch comprises 15–25% by weight of phosphorescent particles and 75–85% by weight of a polymer. Any synthetic resin, if it can be formed into fibers, may be used in the present invention. Preferred are polyester, polypropylene and polyamide. As for a polypropylene with a melt index of 25 and a tensile strength at yield of 350 kg/cm$^2$, it is mixed at a weight ratio of 85–75:15–25 with the encapsulated phosphorescent particles.

The master batch was compounded with virgin polymers (hereinafter referred to as "polymer mixture") and the small amounts of additives such as softener and dispersing agent. Additionally, there may be used other additives which are well known in the art, such as antistatic agents, UV blocking agents, flame retardants, etc. The polymer mixture consists of two polymers. One is the same polymer used to produce a master batch, the other is a polymer of the same chemical structure but different in physical properties such as melt index and tenacity. For example, a polypropylene (PP) chip with a melt index of 25 and a tensile strength at yield of 350 kg/cm$^2$ is compounded at a weight ratio of 75–85:25–15 with a PP chip with a melt index of 35 and a tensile strength at yield of 340 kg/cm$^2$. In this case, even if the tensile strength at yield is slightly lowered, an improvement can be brought about in fluidity and tackiness, resulting in good spinnability and a reduction in yarn-cutting rate. Upon compounding, the master batch is mixed at a weight ratio of 30:70–70:30 with polymer mixture.

The mixture composed of master batch, polymer mixture, and additives is then fed into the extruder via a hopper. The mixture is melt-spun at 190–290° C. for producing phosphorescent monofilament with a fineness of 10–100 deniers. When it is desired, the monofilaments may be doubled for application to clothing or textile products for use in various purposes. Depending on the polymer used, polypropylene, nylon, or polyester monofilment having luminescent properties can be produced.

With encapsulated phosphorescent particles and polymer mixture, the spinning process can be carried out under constant conditions irrespective of the particle morphology and without causing yarn cutting. Additionally, the encapsulated phosphorescent particles enhance the physical properties such as tenacity of the resulting fiber, as well as minimizing the damage to the spinning machine.

A better understanding of the present invention may be obtained in light of the following examples which are set forth to illustrate, but are not to be construed to limit the present invention.

EXAMPLE 1

As phosphorescent particles suitable for use in the present invention, LumiNova G-300 C was used. They were composed of 57% by weight of strontium oxide, 39% by weight of aluminum oxide, 3.3% by weight of dysprosium oxide, and 0.75% by weight of europium oxide, ranging, in particle size distribution, from 10 to 60 $\mu$m with an average size of about 42 $\mu$m. 80% of them were globular while the remainder was needle-shaped.

In order to microencapsulate these the phosphorescent particle, maleic anhydride-grafted polypropylene (MAH-PP) was used as wall material. In this regard, the phosphorescent particle as a core material and MAH-PP as a wall material were used at a weight ratio of 30:1. MAH-PP was completely dissolved in a good-solvent, such as xylene, at 125° C., after which the core material was added to the solution with stirring. Afterwards, poor-solvents, such as ethylene glycol monoethyl ether, were further added dropwise to encapsulate the phosphorescent particles. The resulting solution was cooled to room temperature and then stabilized at 0° C. for 12 hours, followed by filtration to obtain phosphorescent phosphor particles encapsulated with MAH-PP.

A PP chip having a melt index of 25 and a tensile strength at yield of 350 kg/cm$^2$ was pelletized at a weight ratio of 80:20 with the encapsulated phosphorescent particles to afford a phosphorescent particle-containing polymer chip (master batch).

The master batch was compounded with at a weight ratio of 40:60 with a mixture of a PP chip with a melt index of 25 and a tensile strength at yield of 350 kg/cm$^2$ and a PP chip with a melt index of 35 and a tensile strength at yield of 340 kg/cm$^2$ in the weight ratio of 80:20, in combination with 0.5% by weight of a softener (dioctylphthalate) and 0.5% by weight of a dispersing agent (Ca lubricant) based on the weight of the chips used. The mixture composed of master batch, polymer mixture, and additives is then fed into the extruder via a hopper. The mixture was melt-spun at 200° C. to monofilaments with a fineness of 15 deniers. Doubling them gave PP fibers. Also, phosphorescent filaments are cut to produce phosphorescent staple fibers. And then, phosphorescent nonwoven fabric is produced with phosphorescent staple fibers by thermal-bonding method.

EXAMPLE 2

The phosphorescent particles were encapsulated in the same manner as in Example 1. 20% by weight of the encapsulated phosphorescent particles was mixed with 80% by weight of a PET chip with an intrinsic viscosity of 0.63 and the mixture was pelletized to give master batch. This master batch was compounded with a weight ratio of 40:60 with a mixture of a PET chip with an intrinsic viscosity of 0.63 and a PET chip with an intrinsic viscosity of 0.85 in the weight proportion of 20:80, in combination with 0.5% by weight of a softener (dioctylphthalate) and 0.5% by weight of a dispersing agent (Ca lubricant) based on the weight of the chips used. The mixture composed of master batch, polymer mixture, and additives is then fed into the extruder via a hopper. The mixture was melt-spun at 280° C. to monofilaments with a fineness of 15 deniers. Doubling them gave PET fibers. Also, phosphorescent filaments are cut to produce phosphorescent staple fibers. And then, phosphorescent nonwoven fabric is produced with phosphorescent staple fibers by thermal-bonding method.

EXAMPLE 3

The phosphorescent phosphor particles were encapsulated in the same manner as in Example 1. 20% by weight of the encapsulated phosphorescent particles was mixed with 80% by weight of a nylon chip with a relative viscosity of 2.4 and the mixture was pelletized to give master batch. This master batch was compounded with a weight ratio of 40:60 with a mixture of a nylon chip with a relative viscosity of 2.4 and a nylon chip with a relative viscosity of 3.2 in the weight proportion of 20:80, in combination with 0.5% by weight of a softener (dioctylphthalate) and 0.5% by weight of a dispersing agent (Ca lubricant) based on the weight of the chips used. The mixture composed of master batch, polymer mixture, and additives is then fed into the extruder via a hopper. The mixture was melt-spun at 250° C. to monofilaments with a fineness of 15 deniers. Doubling them gave nylon fibers. Also, phosphorescent filaments are cut to produce phosphorescent staple fibers. And then, phosphorescent nonwoven fabric is produced with phosphorescent staple fibers by thermal-bonding method.

TABLE 3

|  | Example 1 | Example 2 | Example 3 |
|---|---|---|---|
| Encapsulated | 3.1 g/d | 3.3 g/d | 3.5 g/d |
| Non-capsulated | 2.2 g/d | 2.8 g/d | 2.9 g/d |

As described herein before, conventional techniques recruit phosphorescent particles which are uniformly globular with small particle sizes in order to circumvent the problems resulting from the employment of large-size particles, associated with the compatibility with synthetic resins, the establishment of constant spinning conditions, the yarn-cutting upon spinning, and the damage of spinning machines and take-up rollers. However, the luminescent properties are poor if the phosphorescent particle is small in particle size. In contrast, the encapsulation of phosphorescent particles according to the present invention enables large-size phosphorescent particles of irregular shapes to be used without causing the problems that the conventional techniques have suffered from. A phosphorescent fiber comprising 9% by weight of encapsulated phosphorescent pigment exhibits a light density of about 900 mcd/m$^2$ after one minute. Therefore, the present invention can provide phosphorescent fibers with a high degree of luminescence, which has physical properties suitable for use for various purposes.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a phosphorescent fiber, comprising the steps of:

encapsulating phosphorescent particles composed of 55–62.5% by weight of strontium oxide, 35–42.5% by weight of aluminum oxide, 1–9% by weight of dysprosium oxide and 0.5–1.5% by weight of europium oxide;

mixing and pelletizing the encapsulated phosphorescent particles at a weight ratio of 15–25:85–75 with a polymer chip capable of fiber formation to give a encapsulated phosphorescent particle-containing chip (master batch);

compounding 30–70% by weight of the master batch with 30–70% by weight of polymer mixture, in combination with a softener and a dispersing agent, said polymer mixture consists of two polymers, one is the same polymer used to produce a master batch, the other is a polymer in the same chemical structure but different in physical properties such as melt index and tenacity; and melt-spinning the compounded chip at 190–290° C. through a melt extruder.

2. The method as set forth in claim 1, wherein the phosphorescent particles range, in particle size distribution, from 10 to 60 $\mu$m with an average size of about 42 $\mu$m, 80% of which are globular, the remainder being needle-shaped.

3. The method as set forth in claim 1, wherein the encapsulating step is carried out in a phase separation process through the complex coaccervation using maleic anhydride-grafted polypropylene as a wall material.

4. The method as set forth in claim 3, wherein the phase separation process comprises the steps of:

completely dissolving maleic anhydride-grafted polypropylene at 125° C. in xylene as a good-solvent;

adding the phosphorescent particles to the solution with stirring;

dropwise adding ethylene glycol monoethyl ether, serving as a poor-solvent, to the solution;

cooling the solution to room temperature and stabilizing the solution at 0° C. for 12 hours; and filtering encapsulated phosphorescent phosphor particles.

5. The method as set forth in claim 1, wherein the synthetic resin is selected from the group consisting of polypropylene, polyamide and polyester.

6. The method as set forth in claim 1, wherein the softener is dioctylphthalate.

7. The method as set forth in claim 1, wherein the polymer mixture consists of a polypropylene chip with a melt index of 25 and a tensile strength at yield of 350 kg/cm$^2$ and a polypropylene chip with a melt index of 35 and a tensile strength at yield of 340 kg/cm$^2$.

8. The method as set forth in claim 1, wherein the polymer mixture consists of two types of polyester which have intrinsic viscosities of 0.63 and 0.85, respectively.

9. The method as set forth in claim 1, wherein the polymer mixture consists of two types of nylon which have relative viscosities of 2.4 and 3.2, respectively.

* * * * *